(12) United States Patent
Hunt

(10) Patent No.: US 11,126,418 B2
(45) Date of Patent: Sep. 21, 2021

(54) EFFICIENT SHARED IMAGE DEPLOYMENT

(71) Applicant: McAfee, LLC., Santa Clara, CA (US)

(72) Inventor: Simon Hunt, Naples, FL (US)

(73) Assignee: McAfee, LLC, San Jose, CA (US)

( * ) Notice: Subject to any disclaimer, the term of this patent is extended or adjusted under 35 U.S.C. 154(b) by 593 days.

(21) Appl. No.: 13/649,970

(22) Filed: Oct. 11, 2012

(65) Prior Publication Data
US 2014/0108590 A1    Apr. 17, 2014

(51) Int. Cl.
*G06F 8/61* (2018.01)
(52) U.S. Cl.
CPC . *G06F 8/63* (2013.01); *G06F 8/61* (2013.01)
(58) Field of Classification Search
CPC ................................ H04L 9/0643; G06F 8/63
USPC ......................................................... 709/217
See application file for complete search history.

(56) References Cited

U.S. PATENT DOCUMENTS

| | | | | |
|---|---|---|---|---|
| 4,965,715 A * | 10/1990 | Yoshida | ................. | G06F 9/4494 712/201 |
| 5,197,002 A * | 3/1993 | Spencer | ................. | G06Q 30/04 705/34 |
| 5,465,353 A * | 11/1995 | Hull | ..................... | G06K 9/00442 |
| 5,729,741 A * | 3/1998 | Liaguno | ............ | G06F 17/30017 |
| 5,757,915 A * | 5/1998 | Aucsmith | ............... | G06F 21/51 713/167 |
| 5,768,532 A * | 6/1998 | Megerian | .......... | G06F 17/30949 370/409 |
| 6,253,324 B1 * | 6/2001 | Field | ................... | G06F 21/6245 713/187 |
| 6,341,373 B1 * | 1/2002 | Shaw | ...................... | G06F 21/57 709/203 |
| 6,463,535 B1 * | 10/2002 | Drews | .......................... | 713/176 |
| 6,493,871 B1 * | 12/2002 | McGuire | .................. | G06F 8/65 717/169 |
| 6,618,735 B1 * | 9/2003 | Krishnaswami | .......... | G06F 8/65 |

(Continued)

FOREIGN PATENT DOCUMENTS

| | | |
|---|---|---|
| EP | 1 482 407 A1 | 12/2004 |
| EP | 1482407 A1 * 12/2004 | ............... G06F 8/60 |

(Continued)

OTHER PUBLICATIONS

Barr et al., "A boosting ensemble for the recognition of code sharing in malware", 2007.*

(Continued)

*Primary Examiner* — Ondrej C Vostal
(74) *Attorney, Agent, or Firm* — Byrne Poh LLP

(57) ABSTRACT

Technologies for distribution of a shared image include determining results of a first hash operation applied to a plurality of elements of an image of a software installation, determining results of the first hash operation applied to the plurality of contents of a client, comparing results of the first hash operation applied to the plurality of elements of the image with the results of the first hash operation applied to the plurality of contents of the client, determining that one or more of the plurality of elements of the image are unavailable on the client based on the comparison of the results of the first hash operation applied to the plurality of elements of the image with the results of the first hash operation applied to the plurality of contents of the client, and causing the transmission of the elements to the client.

12 Claims, 6 Drawing Sheets

(56) References Cited

U.S. PATENT DOCUMENTS

| | | | | |
|---|---|---|---|---|
| 6,671,407 B1* | 12/2003 | Venkatesan | G06F 17/30247 | 382/232 |
| 6,742,028 B1* | 5/2004 | Wang | H04L 67/104 | 709/223 |
| 7,222,235 B1* | 5/2007 | Mitsui | G06F 17/211 | 380/28 |
| 7,581,168 B2* | 8/2009 | Boon | G06F 17/246 | 707/999.003 |
| 7,603,440 B1* | 10/2009 | Grabowski | G06F 17/30067 | 709/220 |
| 7,657,654 B2* | 2/2010 | Cohen | G06F 16/20 | 709/243 |
| 7,673,297 B1* | 3/2010 | Arsenault | G06F 8/65 | 717/168 |
| 7,747,582 B1* | 6/2010 | Kaminski, Jr. | G06F 16/951 | 707/687 |
| 7,756,892 B2* | 7/2010 | Levy | G06F 17/30067 | 707/781 |
| 7,761,466 B1* | 7/2010 | Eshghi | G06F 17/30247 | 707/705 |
| 7,814,078 B1* | 10/2010 | Forman | G06F 16/24554 | 707/698 |
| 7,860,971 B2* | 12/2010 | Gao | G06F 16/957 | 709/225 |
| 7,882,139 B2* | 2/2011 | Zou | G06F 16/137 | 707/798 |
| 8,156,132 B1* | 4/2012 | Kaminski, Jr. | G06K 9/4642 | 707/758 |
| 8,176,321 B1* | 5/2012 | Perry | H04L 67/2819 | 713/167 |
| 8,243,080 B2* | 8/2012 | Opala | G06F 3/14 | 345/428 |
| 8,270,963 B1* | 9/2012 | Hart | G06F 8/65 | 455/418 |
| 8,332,357 B1* | 12/2012 | Chung | G06F 16/27 | 707/634 |
| 8,352,494 B1* | 1/2013 | Badoiu | G06F 17/30256 | 382/224 |
| 8,423,790 B2* | 4/2013 | Atashband | G06F 21/121 | 713/189 |
| 8,499,114 B1* | 7/2013 | Vincent | G06F 9/5077 | 711/147 |
| 8,725,682 B2* | 5/2014 | Young | G06F 17/30017 | 707/610 |
| 8,738,917 B2* | 5/2014 | Wakao | H04N 1/32101 | 713/176 |
| 8,799,401 B1* | 8/2014 | Bryar | G06F 17/30253 | 709/217 |
| 8,850,547 B1* | 9/2014 | Feeser | H04L 67/34 | 726/9 |
| 8,949,825 B1* | 2/2015 | Fitzgerald | G06F 21/53 | 718/1 |
| 9,026,615 B1* | 5/2015 | Sirton | H04L 65/60 | 709/217 |
| 9,122,705 B1* | 9/2015 | Ioffe | G06F 16/583 | |
| 9,129,007 B2* | 9/2015 | Lamanna | G06F 17/30613 | |
| 9,280,337 B2* | 3/2016 | Palaniappan | G06F 8/61 | |
| 9,436,558 B1* | 9/2016 | Per | G06F 11/1451 | |
| 2002/0052885 A1* | 5/2002 | Levy | G06F 17/30067 | |
| 2002/0111942 A1* | 8/2002 | Campbell | G06F 16/958 | |
| 2002/0178271 A1* | 11/2002 | Graham | G06F 21/6245 | 709/229 |
| 2002/0178410 A1* | 11/2002 | Haitsma | G06F 17/30787 | 714/709 |
| 2003/0123701 A1* | 7/2003 | Dorrell | G06F 21/64 | 382/100 |
| 2003/0182414 A1* | 9/2003 | O'Neill | G06F 9/3004 | 709/223 |
| 2004/0044894 A1* | 3/2004 | Lofgren et al. | 713/176 | |
| 2004/0044996 A1* | 3/2004 | Atallah | G06F 8/71 | 717/169 |
| 2004/0145661 A1* | 7/2004 | Murakami | H04N 1/32144 | 348/222.1 |
| 2004/0199594 A1* | 10/2004 | Radatti | G06F 21/56 | 709/206 |
| 2004/0221062 A1* | 11/2004 | Starbuck | G06Q 10/107 | 709/246 |
| 2004/0255289 A1* | 12/2004 | Alex George | G06F 9/4445 | 717/174 |
| 2005/0252963 A1* | 11/2005 | Adams | G06F 21/52 | 235/382 |
| 2005/0278499 A1* | 12/2005 | Durham | G06F 12/1433 | 711/173 |
| 2006/0031425 A1* | 2/2006 | Nelson | G06F 8/63 | 709/220 |
| 2006/0112013 A1* | 5/2006 | Maloney | G06Q 20/04 | 705/45 |
| 2006/0130037 A1* | 6/2006 | Mackay | G06F 8/658 | 717/168 |
| 2006/0242418 A1* | 10/2006 | Willamowski | G06T 1/0071 | 713/176 |
| 2007/0092103 A1* | 4/2007 | Mihcak | G06T 1/0028 | 382/100 |
| 2007/0130350 A1* | 6/2007 | Alperovitch | H04L 63/1425 | 709/229 |
| 2007/0156837 A1* | 7/2007 | Elgar | G06Q 40/02 | 709/208 |
| 2007/0174624 A1* | 7/2007 | Wolosewicz et al. | 713/176 | |
| 2007/0204003 A1* | 8/2007 | Abramson | H04L 67/06 | 709/217 |
| 2007/0239756 A1* | 10/2007 | Li | G06F 17/30864 | |
| 2007/0245119 A1* | 10/2007 | Hoppe | H04L 45/7453 | 711/216 |
| 2007/0250521 A1* | 10/2007 | Kaminski, Jr. | G06F 17/30244 | |
| 2008/0091765 A1* | 4/2008 | Gammage | G06T 7/40 | 709/202 |
| 2008/0104416 A1* | 5/2008 | Challener | H04L 9/0894 | 713/189 |
| 2008/0112627 A1* | 5/2008 | Oda | A61B 1/041 | 382/232 |
| 2008/0177799 A1* | 7/2008 | Wilson | G06F 21/64 | |
| 2008/0215722 A1* | 9/2008 | Hogaboom | H04L 43/00 | 709/224 |
| 2008/0256363 A1* | 10/2008 | Balacheff | G06F 21/572 | 713/187 |
| 2009/0034847 A1* | 2/2009 | Hirohata et al. | 382/190 | |
| 2009/0064122 A1* | 3/2009 | Bielski | G06F 8/65 | 717/168 |
| 2009/0089337 A1* | 4/2009 | Perlin | G06F 17/30144 | |
| 2009/0150169 A1* | 6/2009 | Kirkwood | G06Q 10/00 | 705/342 |
| 2009/0164526 A1* | 6/2009 | Hayashi | 707/203 | |
| 2009/0193211 A1* | 7/2009 | Hu | G06F 21/575 | 711/163 |
| 2009/0222461 A1* | 9/2009 | Alpern | G06F 16/188 | |
| 2009/0222462 A1* | 9/2009 | Alpern | G06F 17/30 | |
| 2009/0240735 A1* | 9/2009 | Grandhi | G06Q 30/02 | |
| 2009/0300603 A1* | 12/2009 | Schneider | G06F 8/63 | 717/178 |
| 2009/0313269 A1* | 12/2009 | Bachmann | G06F 21/645 | |
| 2010/0088512 A1* | 4/2010 | Schwartz | G06F 17/3089 | 713/168 |
| 2010/0095076 A1* | 4/2010 | Okada | G06F 8/63 | 711/161 |
| 2010/0138931 A1* | 6/2010 | Thorley | H04L 63/20 | 726/27 |
| 2010/0223610 A1* | 9/2010 | Dehaan | G06F 8/63 | 717/178 |
| 2010/0246818 A1* | 9/2010 | Yao | H04L 9/0838 | 380/44 |
| 2010/0257523 A1* | 10/2010 | Frank | 718/1 | |
| 2010/0274755 A1* | 10/2010 | Stewart | G06F 8/75 | 706/54 |
| 2010/0275252 A1* | 10/2010 | Yun | H04L 9/3236 | 726/7 |
| 2010/0312805 A1* | 12/2010 | Noonan, III | G06F 8/63 | 707/822 |

(56) References Cited

U.S. PATENT DOCUMENTS

| | | | |
|---|---|---|---|
| 2011/0033128 A1* | 2/2011 | Watkins | G06F 17/30212 382/254 |
| 2011/0066999 A1* | 3/2011 | Rabinovich | G06F 8/51 717/104 |
| 2011/0072047 A1* | 3/2011 | Wang et al. | 707/776 |
| 2011/0093701 A1* | 4/2011 | Etchegoyen | G06F 21/121 713/165 |
| 2011/0113029 A1* | 5/2011 | Kaal | H04L 67/104 707/723 |
| 2011/0138192 A1* | 6/2011 | Kocher | G06F 21/602 713/189 |
| 2011/0225128 A1* | 9/2011 | Jarrett | G06F 8/71 707/692 |
| 2011/0238639 A1* | 9/2011 | Matsuura | G06F 16/1748 707/698 |
| 2011/0255132 A1* | 10/2011 | Shimada | 358/1.15 |
| 2011/0305399 A1* | 12/2011 | Zitnick | G06F 17/30256 382/225 |
| 2011/0314045 A1* | 12/2011 | Konig | G06F 17/30675 707/769 |
| 2011/0314346 A1* | 12/2011 | Vas | G06F 16/13 714/49 |
| 2011/0314516 A1* | 12/2011 | Li | G06F 9/522 726/3 |
| 2012/0011102 A1* | 1/2012 | Borden | G06F 16/162 707/654 |
| 2012/0011507 A1* | 1/2012 | Sasaki | G06F 8/65 718/1 |
| 2012/0047121 A1* | 2/2012 | Canel | G06F 16/951 707/709 |
| 2012/0078970 A1* | 3/2012 | Matsakis | G06F 16/2272 707/800 |
| 2012/0124566 A1* | 5/2012 | Federighi | G06F 8/61 717/164 |
| 2012/0144383 A1* | 6/2012 | Mishra | G06F 11/0793 717/173 |
| 2012/0158760 A1* | 6/2012 | Borden | G06F 16/182 707/758 |
| 2012/0246125 A1* | 9/2012 | Kato | G06F 17/30067 707/692 |
| 2012/0254993 A1* | 10/2012 | Sallam | G06F 21/53 726/22 |
| 2012/0290640 A1* | 11/2012 | Mahaffey | G06F 21/57 709/203 |
| 2012/0294307 A1* | 11/2012 | Fujihira | H04L 45/7453 370/389 |
| 2012/0324446 A1* | 12/2012 | Fries | G06F 21/64 718/1 |
| 2013/0013673 A1* | 1/2013 | Ahmed et al. | 709/203 |
| 2013/0042083 A1* | 2/2013 | Mutalik | G06F 3/0604 711/162 |
| 2013/0047149 A1* | 2/2013 | Xu | G06F 21/53 717/175 |
| 2013/0055231 A1* | 2/2013 | Hyndman | G06F 8/658 717/169 |
| 2013/0066901 A1* | 3/2013 | Marcelais | G06F 16/137 707/769 |
| 2013/0166514 A1* | 6/2013 | Schultz | G06F 21/64 707/690 |
| 2013/0179408 A1* | 7/2013 | Stoakes | G06F 3/0608 707/692 |
| 2013/0185812 A1* | 7/2013 | Lie | G06F 9/45558 726/29 |
| 2013/0227714 A1* | 8/2013 | Gula | G06F 21/64 726/32 |
| 2013/0283377 A1* | 10/2013 | Das | H04L 63/1441 726/23 |
| 2013/0318357 A1* | 11/2013 | Abraham | G06F 21/565 713/176 |
| 2014/0032915 A1* | 1/2014 | Muzammil | H04L 9/3247 713/176 |
| 2014/0033193 A1* | 1/2014 | Palaniappan | G06F 21/57 717/173 |
| 2014/0067542 A1* | 3/2014 | Everingham | G06Q 30/0241 705/14.64 |
| 2014/0074783 A1* | 3/2014 | Alsina | G06Q 10/10 707/624 |
| 2015/0169633 A1* | 6/2015 | Yee | G06F 17/3028 707/723 |

FOREIGN PATENT DOCUMENTS

| | | | | |
|---|---|---|---|---|
| WO | | 2014/059156 A1 | 4/2014 | |
| WO | WO | 2014059156 A1 * | 4/2014 | G06F 8/61 |

OTHER PUBLICATIONS

Bayer et al., "Improving the Efficiency of Dynamic Malware Analysis", 2010.*

Chen et al., "Towards an Understanding of Anti-virtualization and Anti-debugging Behavior in Modern Malware", 2008.*

Merriam-Webster, "determine", 2016.*

Merriam-Webster, "unavailable", 2020 (Year: 2020).*

Arfan, "Mobile Cloud Computing Security Using Cryptographic Hash Function Algorithm", 2016 (Year: 2016).*

Esfahani et al., "Dual-Homomorphic Message Authentication Code Scheme for Networking Coding-Enabled Wireless Sensor networks", 2015 (Year: 2015).*

Janczewski et al., "Development of a Framework for secure patch management", 2004 (Year: 2004).*

Majias et al., "Lock-Fee Decentralized Storage for Transactional Upgrade Rollback", 2010 (Year: 2010).*

Samsudin et al., "Characteristic Comparison Method to Identify Device Residential Gateway", 2018 (Year: 2018).*

International Search Report and Written Opinion received for PCT Patent Application No. PCT/US2013/064357, dated Feb. 10, 2014, 10 Pages.

Microsoft; "Windows Home Server: Technical Brief—Home Computer Backup and Restore"; http://go.microsoft.com/felink/?Linkld=100260 ; pp. 27, Aug. 2008.

International Preliminary Report on Patentability; PCT/US2013/064357; 7 pages, dated Apr. 23, 2015.

European Search Report, Application No. 13846105.8, 7 pages, dated Apr. 13, 2016.

Office Action for Chinese Patent Application No. 201380047305.1, dated Jun. 14, 2017; 22 pages.

Office Action for Chinese Patent Application No. 201380047305.1, dated Jan. 10, 2018; 9 pages.

Office Action dated May 9, 2018 in EP Patent Application No. 13846105.8.

* cited by examiner

|  | 306 | 308 | 310 |  |
|---|---|---|---|---|
|  | FILE NAME | HASH (1) | HASH (2) |  |
| 302 → | file1.txt | 123 | 986 | SHARED IMAGE FILE HASH TABLE |
|  | file2.exe | 456 | 656 |  |
|  | file3.bat | 789 | 273 |  |
|  | file4.cfg | 987 | 142 |  |
|  | file5.dat | 654 | 629 |  |
|  | file6.sys | 321 | 013 |  |
|  | file7.db | 128 | 197 |  |
|  | file1.txt | 773 | 269 |  |
|  | ⋮ |  |  |  |

|  | 312 | 314 | 316 |  |
|---|---|---|---|---|
|  | CLUSTER ADDRESS | HASH (1) | HASH (2) |  |
| 304 → | 0001 | 405 | 567 | SHARED IMAGE CLUSTER HASH TABLE |
|  | 0002 | 918 | 992 |  |
|  | 0003 | 266 | 362 |  |
|  | 0004 | 381 | 285 |  |
|  | 0005 | 909 | 486 |  |
|  | ⋮ |  |  |  |

| FILE NAME | DIRECTORY | HASH (1) | HASH (2) | FOUND? |
|---|---|---|---|---|
| file1.txt | \dir\, \dir3\ | 123 | 986 | <address> |
| file2.exe | \dir\ | 456 | 656 | <address> |
| file3.bat | \dir2\ | 789 | 273 | <address> |
| file4.cfg | \dir3\ | 987 | 142 | <address> |
| file5.dat | \dir3\ | 654 | 629 | |
| file7.db | \dir\ | 128 | 197 | <address> |
| file1.txt | \dir4\ | 773 | 269 | |
| file6.sys | \dir\ | 321 | 013 | |

504

| FILE NAME | DIRECTORY | HASH (1) | HASH (2) | IMAGE MAP |
|---|---|---|---|---|
| file9.txt | \dir23\ | 144 | | |
| file10.txt | \dir23\ | 123 | 986 | <address> |
| file1.txt | \dir4\ | 773 | 443 | |
| file2.exe | \dir4\, \dir\ | 456 | 656 | <address> |
| file3.bat | \dir2\ | 789 | 273 | <address> |
| file4a.cfg | \dir3\ | 987 | 142 | <address> |
| file5.dat | \dir3\ | 201 | | |
| file7.db | \dir79\ | 128 | 197 | <address> |
| file10.txt | \dir79\ | 663 | | |

502

| FILE NAME | IMAGE DIRECTORY | HASH (1) | HASH (2) |
|---|---|---|---|
| file5.dat | \dir3\ | 654 | 629 |
| file1.txt | \dir4\ | 773 | 269 |
| file6.sys | \dir\ | 321 | 013 |

EFFICIENT SHARED IMAGE DEPLOYMENT

TECHNICAL FIELD OF THE INVENTION

Embodiments of the present invention relate generally to computer security and, more particularly, to efficient shared image deployment.

BACKGROUND

Malware infections on computers and other electronic devices are very intrusive and hard to detect and repair. Anti-malware solutions may require matching a signature of malicious code or files against evaluated software to determine that the software is harmful to a computing system. Anti-malware solutions may include scanning of clients or endpoints for indications of malware or repairing clients or endpoints for malware infections. Data files, malware signatures, remedial applications, or other anti-malware components may be downloaded to an endpoint.

Applications for execution on an electronic device may require installation before they can be executed. Some applications may be installed by simply copying code to a target electronic device but others may use installation applications. Installation applications may typically include installation source files and code used to perform modifications and installations that are used to run a given application. Installation applications may unpack files, create folders on the target electronic device, store material in the folders, and otherwise make the application available for execution.

BRIEF DESCRIPTION OF THE DRAWINGS

For a more complete understanding of embodiments of the present invention and its features and advantages, reference is now made to the following description, taken in conjunction with the accompanying drawings, in which:

FIG. 5 is an illustration of example operation of a system to determine whether files for constructing a shared image are available;

DETAILED DESCRIPTION

Figure 1:
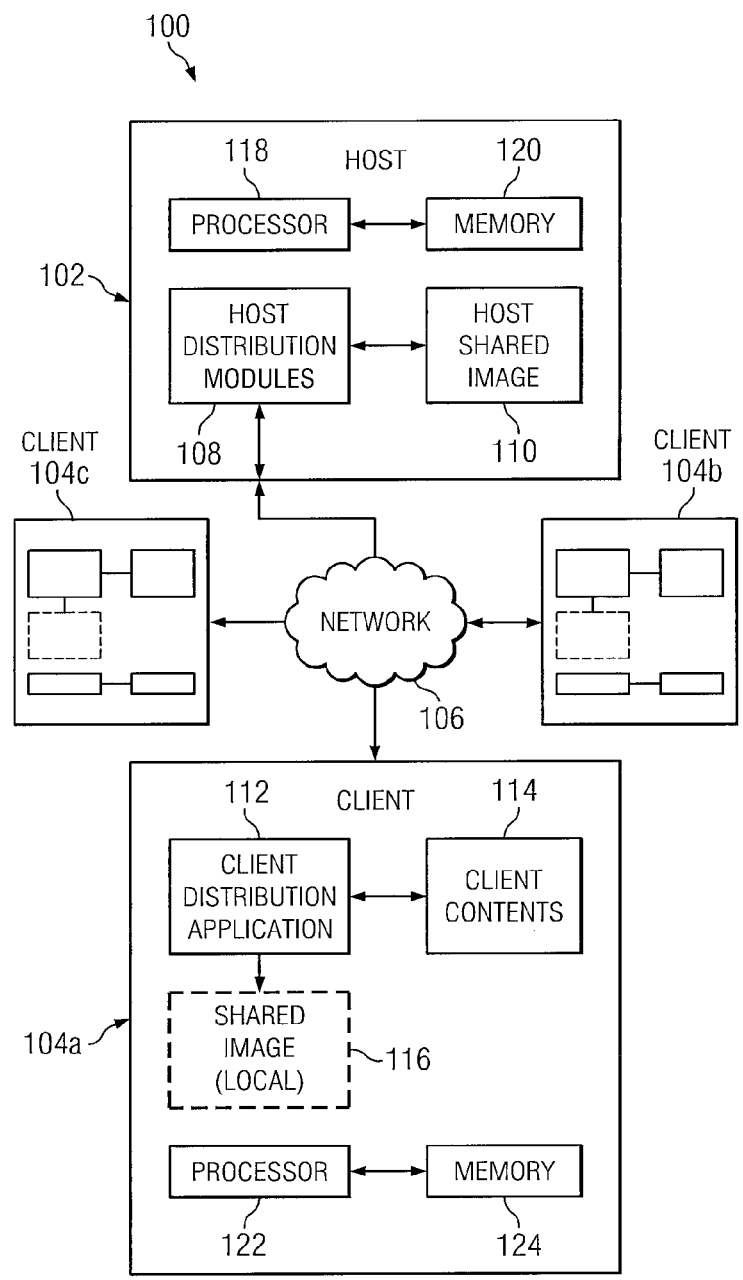
FIG. 1 is an illustration of an example system for efficient shared image deployment.

FIG. 1 is an illustration of an example system 100 for efficient shared image deployment. Such a shared image may include, for example, a virtual machine, or any suitable software image or installation. Deployment may be made between a host, such as host 102, and one or more clients, such as clients 104. System 100 may be configured to determine the differences between components installed on a given client 104 and the components available from a master image on host 102. System 100 may be configured to make such a determination in any suitable manner. Furthermore, system 100 may be configured to provide any components not already installed or otherwise available on the given client 104.

Host 102 may be implemented by any suitable mechanism, such as a module, server, computer, mobile device, system-on-a-chip, other electronic device, or any suitable combination of digital and analog circuitry. In one embodiment, host 102 may include a processor 118 coupled to a memory 120. Host 102 may include instructions in memory 120 for execution by processor 118. In another embodiment, processor 118 and memory 120 may be resident on another electronic device and may execute host 102 as a module.

In one embodiment, host 102 may include one or more host distribution modules 108 configured to control the distribution of software to clients 104. In other embodiments, host distribution modules 108 may be resident or operating on another suitable electronic device. Host distribution modules 108 may be implemented by any suitable module, function, script, executable, application, logic, software, hardware, firmware, or combination thereof configured as described herein.

In one embodiment, host 102 may include a host shared image 110 which may include a master image of a software installation to be installed on clients 104. In other embodiments, host shared image 110 may be resident on another suitable electronic device and communicatively coupled to host distribution modules 108. Host shared image 110 may be implemented by any suitable set of files, instructions, or other digital information. Host shared image 110 may include a set of files or other information making up, for example, a virtual machine installation such as an operating system, a virtual deployment environment, a sandbox, or a secured module such as a secured browser. Host shared image 110 may include such an installation to be installed and configured in the same way among multiple of clients 104. Furthermore, host shared image 110 may be quite large, including many megabytes or gigabytes of information. For example, a sandbox module or application, allowing programs, scripts, or other content that may contain malware to be safely run, may include nearly 500 megabytes of information necessary to be executed on a client. Although a single host shared image 110 is illustrated, host 102 may include many such images, which may include installation or disk images with a variety of content, such as different operating systems, configured in a particular way. Such images may be used to establish, for example, common virtual machine execution images on a variety of clients 104.

Host distribution modules 108 may be configured to distribute host shared image 110 to clients 104 through any suitable manner or mechanism. In one embodiment, host distribution modules 108 may be communicatively coupled to or in communication with clients 104 through network 106. Network 106 may be implemented in any suitable manner, such as by a wide area network, local area network, wireless network, the Internet, an intranet, or any combination thereof.

Each client 104 may be implemented by any suitable electronic device, such as a computer, laptop, mobile device, or server. Although an example embodiment of client 104 is illustrated in client 104a, each client 104 may vary in implementation from other such clients. Client 104a may include one or more client distribution modules 112 communicatively coupled to client contents 114. Client distribution modules 112 may be implemented in any suitable manner or by any suitable mechanism, such as by a module, function, logic, library, executable, application, script, software, hardware, firmware, or combination thereof. Client contents 114 may include one or more files, libraries, or other digital entities resident on client 104a. Client contents 114 may include a virtual machine installation previously installed on client 104a. Furthermore, client contents 114 may include a virtual machine installation that is a previous version of a virtual machine to be installed on client 104a. Such a virtual machine to be installed on client 104a may be included within host shared image 110. Client 104a may include a processor 122 coupled to a memory 124. Processor 122 may include instructions to be executed by memory 124. Such instructions may include instructions for the operation of client distribution modules 112.

Although client 104a is illustrated as including client distribution modules 112 and host 102 is illustrated as including host distribution modules 108, each of client distribution modules 112 and host distribution modules 108 may be resident on or executing on any suitable electronic device while performing the operations described. Furthermore, client distribution modules 112 and host distribution modules 108 may be implemented on the same or in similar modules, applications, functions, libraries, executables, logic, hardware, software, firmware, or combination thereof.

Client distribution modules 112 may be configured to communicate with host distribution modules 108. Client distribution modules 112, host distribution modules 108, or a combination of both may be configured to determine what portions of client contents 114 may be used to install host shared image 110 on client 104a and what portions are necessary to be downloaded. Client distribution modules 112, host distribution modules 108, or a combination of both may be configured to perform such a determination in any suitable manner or mechanism.

Once such portions of client contents 114 already resident on client 104a or those portions necessary to be downloaded are determined, host distribution modules 108 may be configured to send additional files or content sufficient for client distribution modules 112 to install shared image 116 on client 104a. Host distribution modules 108 may prepare an installation package with the additional files or content for client distribution modules 112 to execute. In one embodiment, only files or content not already resident on client 104a may be sent by host distribution modules 108. In another embodiment, shared image 116 may replicate in memory the configuration and structure of host shared image 110. Host distribution modules 108 may be configured to replicate the process of created a shared image of host shared image 110 on multiple of clients 104.

The process of determining files needed to construct shared image 116 on client 104a may be performed on demand and may save much bandwidth. For example, if a sandbox module or application is needed to execute a suspicious file, script, or other content, only the necessary portions of the sandbox module not already available on client 104a may be determined and transmitted to client 104a. When such a sandbox module is quite large, including hundreds of megabytes, with particular execution configuration, perhaps unknown by a user, the ability to efficiently deploy the needed content to client 104a may save significant bandwidth and time and may assist in securing client 104a.

Processors 118, 122 may comprise, for example a microprocessor, microcontroller, digital signal processor (DSP), application specific integrated circuit (ASIC), or any other digital or analog circuitry configured to interpret and/or execute program instructions and/or process data. In some embodiments, processors 118, 122 may interpret and/or execute program instructions and/or process data stored in memories 120, 124. Memories 120, 124 may be configured in part or whole as application memory, system memory, or both. Memories 120, 124 may include any system, device, or apparatus configured to hold and/or house one or more memory modules. Each memory module may include any system, device or apparatus configured to retain program instructions and/or data for a period of time (e.g., computer-readable storage media). Instructions, logic, or data for client distribution modules 112 and host distribution modules 108 may reside in memories 120, 124 for execution by processors 118, 122.

Processors 118, 122 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. Processors 118, 122 may also include register renaming logic and scheduling logic, which generally allocate resources and queue the operation corresponding to the convert instruction for execution. After completion of execution of the operations specified by the code instructions, back end logic within processors 118, 122 may retire the instruction. In one embodiment, processors 118, 122 may allow out of order execution but requires in order retirement of instructions. Retirement logic within processors 118, 122 may take a variety of forms as known to those of skill in the art (e.g., re-order buffers or the like). The processor cores of processors 118, 122 are thus transformed during execution of the code, at least in terms of the output generated by the decoder, the hardware registers and tables utilized by the register renaming logic, and any registers modified by the execution logic.

Figure 2:
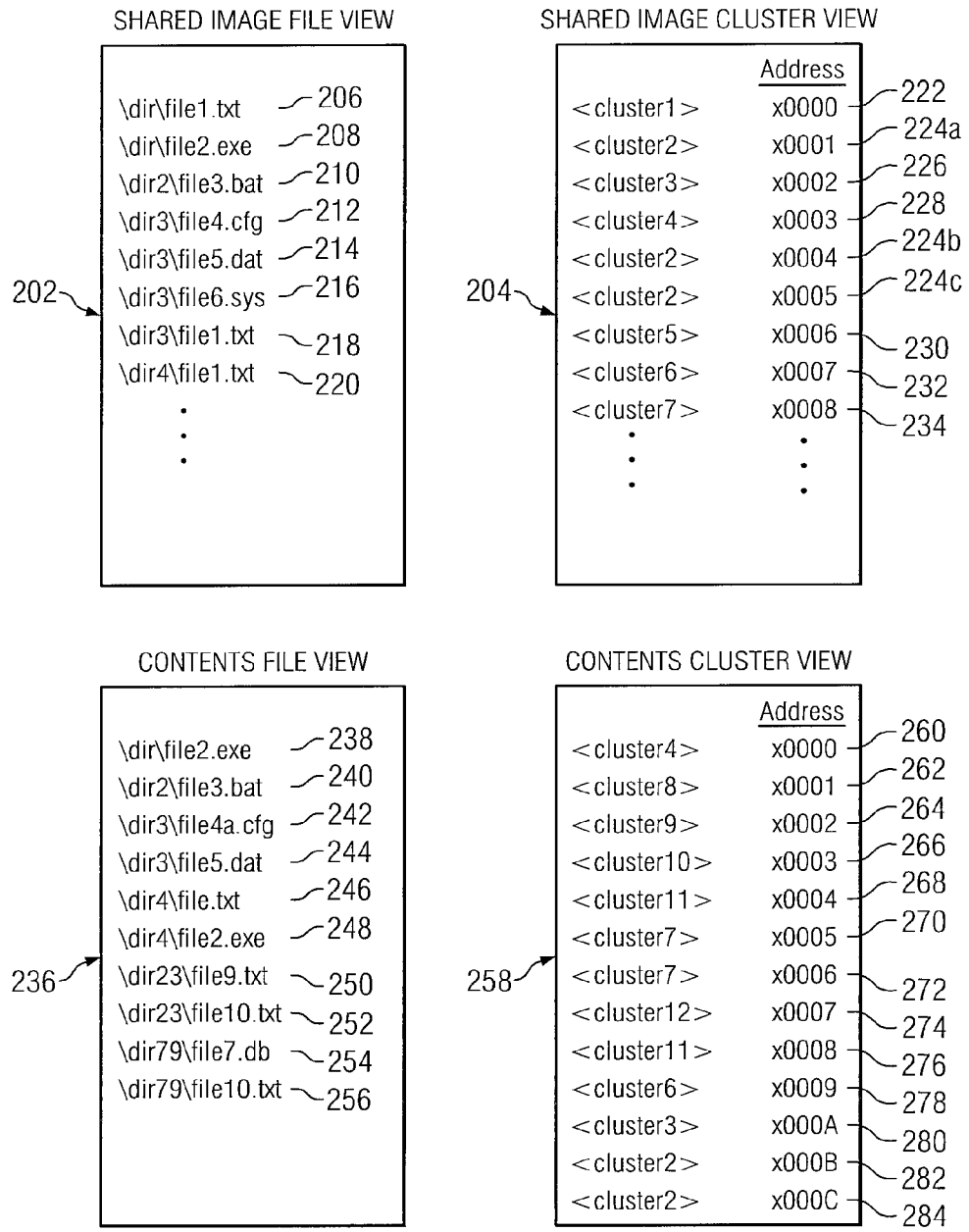
FIG. 2 illustrates example embodiments of shared images and example embodiments of contents that may be used by a system to determine differences between shared images and content on clients.

FIG. 2 illustrates example embodiments of shared images and example embodiments of contents that may be used by system 100 to determine differences between shared images and content on clients.

In one embodiment, shared images of a distribution may include a shared image file view 202. In such an embodiment, system 100 may determine on a file-by-file basis whether contents necessary for the operation of the host shared image are present on a client or not. In another embodiment, shared images of a distribution may include a shared image cluster view 204. In such an embodiment, system 100 may determine on a cluster-of-files basis whether contents necessary for the operation of the host shared image are present on a client or not. Such a cluster may include a set of files as such files are resident upon disk or in memory. In one embodiment, an operating system partition may be divided into a plurality of such clusters. Shared image file view 202 or shared image cluster view 204 may each implement host shared image 110 from FIG. 1.

In one embodiment, client contents on a given client may include a contents file view 236. In such an embodiment, system 100 may determine on a file-by-file basis whether contents necessary for the operation of the host shared image are present on a client or not. In another embodiment, client contents on a given client may include a contents cluster view 258. In such an embodiment, system 100 may determine on a cluster-of-files basis whether contents necessary for the operation of the host shared image are present on a client or not. Such a cluster may include a set of files as such files are resident upon disk or in memory. Contents file view 236 or contents cluster view 258 may each implement client contents 114 from FIG. 1.

For exemplary purposes, shared image file view 202 may include entries for particular files located in particular directories as they exist in the shared image to be constructed on clients, such as "\dir\file1.txt" 206, "\dir\file2.exe" 208, "\dir2\file1.txt" 210, "\dir3\file4.cfg" 212, "\dir3\file5.dat" 214, "\dir3\file6.sys" 216, "\dir3\file1.txt" 218, and "\dir4\file1.txt" 220. Thus, shared image file view 202 may identify that an image may use files with the same name but located in different directories. The contents of such files with the same name may be the same or different.

Contents file view 236 may be organized in a similar fashion to shared image file view 202, but illustrate example contents of a client such as client 104a. Contents file view 236 may include entries for particular files located in particular directories as they exist within clients, such as "\dir\file2.exe" 238, "\dir2\file3.bat" 240, "\dir3\file4a.cfg" 242, "\dir3\file5.dat" 244, "\dir4\file.txt" 246, "\dir4\file2.exe" 248, "\dir23\file9.txt" 250, "\dir23\file10.txt" 252, "\dir79\file7.db" 254, and "\dir79\file10.txt" 256.

Thus, contents file view 236 may identify multiple files with the same name located in multiple directories, more or less files than appear in shared image file view 202, some files with the same name as appearing in shared image file view 202, and some such files with the same name as appearing in shared image file view 202 further appearing in the same or different directories as those in shared image file view 202. However, some files that may correspond by name or by name and directory between contents file view 236 and shared image file view 202 may in fact have different contents or be different versions of the same file. Even some such files with the same name appearing within shared image file view 202 or within contents file view 236 may have different contents or be different versions of the same file. Likewise, some files that may not correspond by directory between contents file view 236 and shared image file view 202 may contain the same contents. Furthermore, some files that may not even correspond by name between contents file view 236 and shared image file view 202 may contain the same contents.

For exemplary purposes, shared image cluster view 204 may include particular clusters at particular addresses in memory or on disk. Each such cluster may include a given set of instructions, code or other content and for ease of reference and illustrative purposes may be labeled "clustern". Further, the particular addresses may be referenced, for ease of reference and illustrative purposes, and a given memory address "xNNNN". The actual memory addresses given in FIG. 2 are merely examples and may vary in size in a given embodiment. Shared image cluster view 204 may include, for example, "cluster1" at address x0000 222, "cluster2" at address x0001 222, "cluster3" at address x0002 222, "cluster4" at address x0003 222, "cluster2" at address x0004 222, "cluster2" at address x0005 222, "cluster5" at address x0006 222, "cluster6" at address x0007 222, and "cluster7" at address x0008 222. Each cluster may include, for example, a range of data, a plurality of portions of files, or other digital information.

Contents cluster view 258 may be organized in a similar fashion to shared image cluster view 204, but illustrate example contents of a client such as client 104a. Contents cluster view 258 may include entries for particular clusters located at particular addresses as they reside in memory or on disk within clients, such as "cluster4" at address x0000 260, "cluster8" at address x0001 262, "cluster9" at address x0002 264, "cluster10" at address x0003 266, "cluster11" at address x0004 268, "cluster7" at address x0005 270, "cluster7" at address x0006 272, "cluster12" at address x0007 274, "cluster11" at address x0008 276, "cluster6" at address x0009 278, "cluster3" at address x000A 280, "cluster2" at address x000B 282, and "cluster2" at address x000C 264.

Thus, contents cluster view 258 may identify multiple clusters with the same identity located in multiple addresses, more or less clusters than appear in shared image cluster view 204, some clusters with same identity as appearing in shared image cluster view 204, and some such clusters with the same identity as appearing in shared image cluster view 204 further appearing in the same or different address locations as those in shared image cluster view 204.

Client distribution modules 112 and host distribution modules 108 may be configured to determine the differences, for example, between shared image file view 202 and contents file view 236, or between shared image cluster view 204 and contents cluster view 258. Such differences may require determining the actual identity of underlying contents of files or clusters and may require matching contents located in different directories or at different memory addresses. Client distribution modules 112 and host distribution modules 108 may be configured to determine such differences in any suitable manner. For example, client distribution modules 112 or host distribution modules 108 may be configured to identify entries in shared image file view 202, contents file view 236, shared image cluster view 204, and contents cluster view 258 by determining one or more unique identifiers of such entries. In one embodiment, client distribution modules 112 or host distribution modules 108 may be configured to compute one or more hashes or digital signatures of such entries. Any suitable algorithm or other manner of generating a hash or digital signature of information may be used. In a further embodiment, client distribution modules 112 or host distribution modules 108 may be configured to calculate a single such hash or digital signature for each entry. In another further embodiment, client distribution modules 112 or host distribution modules 108 may be configured to calculate multiple such hash or digital signatures for each entry.

Figures 3, 4:
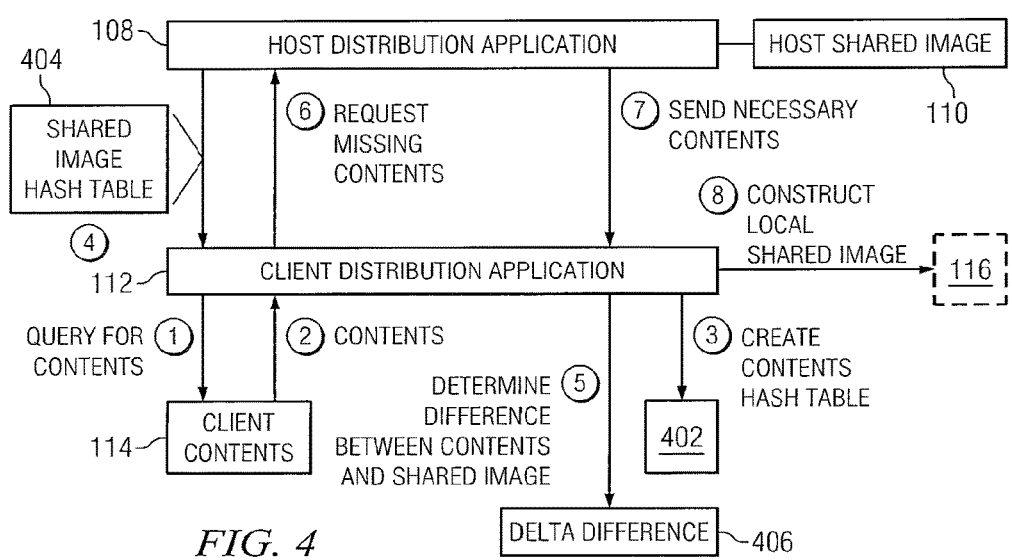
FIG. 3 is an illustration of an example embodiment of hash tables resulting from determining one or more of hashes or digital signatures.
FIG. 4 is an illustration of example operation of a system for efficient shared image deployment.

FIG. 3 is an illustration of an example embodiment of hash tables resulting from the operation of client distribution modules 112 or host distribution modules 108 to determine one or more hashes or digital signatures for each entry in the shared image views. For example, shared image file hash table 302 may be the result of client distribution modules 112 or host distribution modules 108 determining two hashes or digital signatures of each entry in shared image file view 202. Shared image file hash table 302 may include fields corresponding to each file 306 from shared image file view 202, a resulting first hash 308, and a resulting second hash 310. In the example embodiment shown in FIG. 3, "file1.txt" may result in different hash values—"123"-"986" or "773"-"269"—depending upon which "file1.txt" is evaluated. Similar tables corresponding to content views, such as contents file view 236 may be constructed which may include entries for the found files and associated determined hashes and signatures.

Shared image cluster hash table 304 may be the result of client distribution modules 112 or host distribution modules 108 determining two hashes or digital signatures of each entry in shared image cluster view 204. Shared image cluster hash table 304 may include fields corresponding to each cluster address 312 from shared image cluster view 204, a resulting first hash 314, and a resulting second hash 316. Similar tables corresponding to content views, such as contents cluster view 258, may be constructed which may include entries for the found files and associated determined hashes and signatures.

FIG. 4 is an illustration of example operation of system 100 for efficient shared image deployment. Client distribution modules 112 or host distribution modules 108 may determine that a shared image 116 of host shared image 110 is to be constructed locally to client 104a. At (1), client distribution modules 112 may query client 104a for its contents, such as those in client contents 114. After retrieving the contents from client contents 114 at (2), client distribution modules 112 may sort, evaluate, and categorize the results in contents hash table 402 at (3). Contents hash table 402 may be implemented in the same or similar fashion as shared image file hash table 302 or shared image cluster hash table 304 in FIG. 3. Host distribution modules 108 may construct a shared image hash table 404 from host shared image 110, identifying the files, directories, and associated hashes thereof of the elements of host shared image 110. Shared image hash table 402 may be implemented in the same or similar fashion as shared image file hash table 302 or shared image cluster hash table 304 in FIG. 3.

In one embodiment, at (4) host distribution modules 108 may send shared image hash table 404 to client distribution modules 112, which may determine at (5) which portions of host shared image 110 are unavailable in client contents 114. Client distribution modules 112 may make such a determination by determining the delta difference between the entries of contents hash table 402 and shared image hash table 404. In another embodiment, at (4) client distribution modules 112 may send contents hash table 402 to host distribution modules 108, which may determine at (5) which portions of host shared image 110 are unavailable in client contents 114 by, for example, determining the delta difference between the entries of contents hash table 402 and shared image hash table 404.

At (6), the missing contents unavailable on client 104a may be requested by client distribution modules 112. At (7), the necessary contents may be pushed, delivered, or otherwise sent to client distribution modules 112. Such contents may be delivered, for example, in a library or installer. The content sent may include only the portions unavailable on client 104a. At (8), shared image 116 may be constructed by client distribution modules 112 using the content already available on client 104a in client contents 114 and from the content received from host distribution modules 108.

Determining the results of applying a hash operation to client contents 114 or to host shared image 110 may be performed by any suitable module, including host distribution module 108 or client distribution module 112. In one embodiment, host distribution module 108 may determine the results of applying a hash operation to host shared image 110 by applying the hash operation itself. In another embodiment, client distribution module 112 may determine the results of applying a hash operation to host shared image 110 by receiving and analyzing the results of applying the hash operation through, for example, shared image hash table 404. In yet another embodiment, client distribution module 112 may determine the results of applying a hash operation to client contents 114 by applying the hash operation itself. In still yet another embodiment, host distribution module 108 may determine the results of applying a hash operation to client contents 114 by receiving and analyzing the results of applying the hash operation through, for example, contents hash table 402.

FIG. 5 is an illustration of example operation of system 100 to determine whether files for constructing shared image 116 are available by comparing a shared image file hash table 504—describing the contents and structure of host shared image 110—and a contents hash table 502 describing the contents of client contents 114. Shared image file hash table 504 and contents hash table 502 may be constructed and compared by one or a combination of client distribution modules 112 and host distribution modules 108. The comparison of contents hash table 502 and shared image file hash table 504 may yield a difference table 506, which may be used to determine what content or files should be downloaded to client distribution modules 112 for installation on client 104a.

Shared image file hash table 504 and contents hash table 502 may each contain fields for filename, location or directory, and one or more hashes. Contents hash table 502 may include fields for an image map for an address or location of the entry on client 104a. Shared image file hash table 504 may include fields for indicating whether a given entry in shared image file hash table 504 has been found in contents hash table 502 and, if found, an address wherein the corresponding content on client 104a may be found. Such an address may be used by client distribution modules 112 when constructing shared image 116 from contents already existing on client 104a.

Difference table 506 may include fields for a file name, directory, and hashes for elements within host shared image 110 that are not present on client 104a in client contents 114. Host distribution modules 108 may select such elements for download to client distribution modules 112, which may use such elements—in combination with elements already present and identified in shared image file hash table 504 and contents hash table 502—to construct shared image 116.

For example, shared image file hash table 504 may illustrate that contents of shared image 116 may include "file1.txt" with hashes "123" and "986" located in directories "\dir\" and "\dir3\"; "file2.exe" with hashes "456" and "656" located in directory "\dir\"; "file3.bat" with hashes "789" and "656" located in directory "\dir2\"; "file4.cfg" with hashes "987" and "273" located in directory "\dir3\"; "file5.dat" with hashes "654" and "142" located in directory "\dir3\"; "file7.db" with hashes "128" and "197" located in directory "\dir\"; "file1.txt" with hashes "773" and "269" located in directory "\dir4\"; and "file6.sys" with hashes "321" and "013" located in directory "\dir\".

In one embodiment, client distribution modules 112 may be configured to perform a first hash for a given entry in contents hash table 502, but not immediately perform a second hash for the given entry. Given the large number of possible files on client 104a, performing hash calculations on each such file may be costly in terms of computing resources. Client distribution modules 112 may be configured to perform a second hash for a given entry if the given entry's first hash matches an element from shared image file hash table 504. The manner in which a hash value or digital signature is generated may differ between the first hash and second hash. By performing multiple such hash operations on the same input data, errors due to hash collisions may be avoided. Thus, client distribution modules 112 may generate contents hash table 502 including a first hash "144" for "file9.txt" in directory "\dir23\"; a first hash "123" for "file10.txt" in directory "\dir23\"; a first hash "773" for "file1.txt" in directory "\dir4\"; a first hash "456" for "file2.exe" in directories "\dir\" and "\dir4\"; a first hash "789" for "file3.bat" in directory "\dir2\"; a first hash "987" for "file4a.cfg" in directory "\dir3\"; a first hash "201" for "file5.dat" in directory "\dir3\"; a first hash "128" for "file7.db" in directory "\dir79\"; and a first hash "663" for "file10.txt" in directory "\dir79\".

Client distribution modules 112 may compare each element of shared image file hash table 504 against entries from contents hash table 502 to determine whether there is a match. Such a match may indicate that the file is already present on client 104a and will not need to be downloaded or otherwise transferred. If a match is made, client distribution modules 112 may note the address, location, or image map parameters of the contents as they reside on client 104a. Such an address may be given in contents hash table 502. If a match is not made, the entry not found may be placed into difference table 506. After completion of scanning for matches of the entries of shared image file hash table 504, client distribution modules 112 may receive the contents of difference table 506 and, together with the matched contents identified in shared image file hash table 504, build shared image 116 on client 104a.

For example, the element in contents hash table 502 with a first hash "123" for "file10.txt" in directory "\dir23\" may match, at least preliminarily, the element of shared image file hash table 504 for "file1.txt" in directories "\dir\" and "\dir3\" and a first hash of "123." Such a match may be made based on the matching first hash value of "123", even though the file names and directories do not match. Given the matching first hash value, client distribution modules 112 may determine a second hash value of "986" for the element from contents hash table 502, which may match the element of shared image file hash table 504. Thus, it may be determined that the element for "file1.txt" in directories "\dir\" and "\dir3\" of shared image file hash table 504 is already present on client 104a and is available as "file10.txt" in directory "\dir23\". This example may illustrate a situation in which a file used to create host shared image 110 appears in multiple places but need only be searched for once. Furthermore, it may not be recorded in difference table 506. In addition, the location of the element as it resides in client 104a may be recorded in shared image file hash table 504 or contents hash table 502, or a link provided between the corresponding entries in each such table. Thus, when client distribution modules 112 creates shared image 116, a reference to the correct location and correct version of the available file "file1.txt" may be made. In building shared image 116, client distribution modules 112 may rename "file10.txt" or copy it to multiple locations as necessary.

In another example, the element with a first hash "773" for "file1.txt" in directory "\dir4\" may match, at least preliminarily, the element of shared image file hash table 504 for "file1.txt" in directory "\dir4\" and a first hash of "773". Such a match may be made based on the matching first hash value of "773", and the filenames may also match. Given the matching first hash value, client distribution modules 112 may determine a second hash value of "443" for the element from contents hash table 502, which may not match the second hash value—"269"—of the corresponding element of shared image file hash table 504. This example may represent a situation in which a file is named appropriately but has different contents than the actual desired file. Furthermore, this example may represent a situation in which a file passes a first hash matching test but fails a second hash matching test, indicating a hash collision condition. No other matches for the element from shared image file hash table 504 may be found in contents hash table 502. Thus, it may be determined that the element for "file1.txt" in directory "\dir4\" of shared image file hash table 504 is not found and it may be added to difference table 506.

In yet another example, after scanning contents hash table 502 for all elements of shared image file hash table 504, "file9.txt" at directory "\dir23\" with a first hash "144" may not match any such elements from shared image file hash table 504. Thus, such an element may be ignored as irrelevant to construction of shared image 116.

Figure 6:
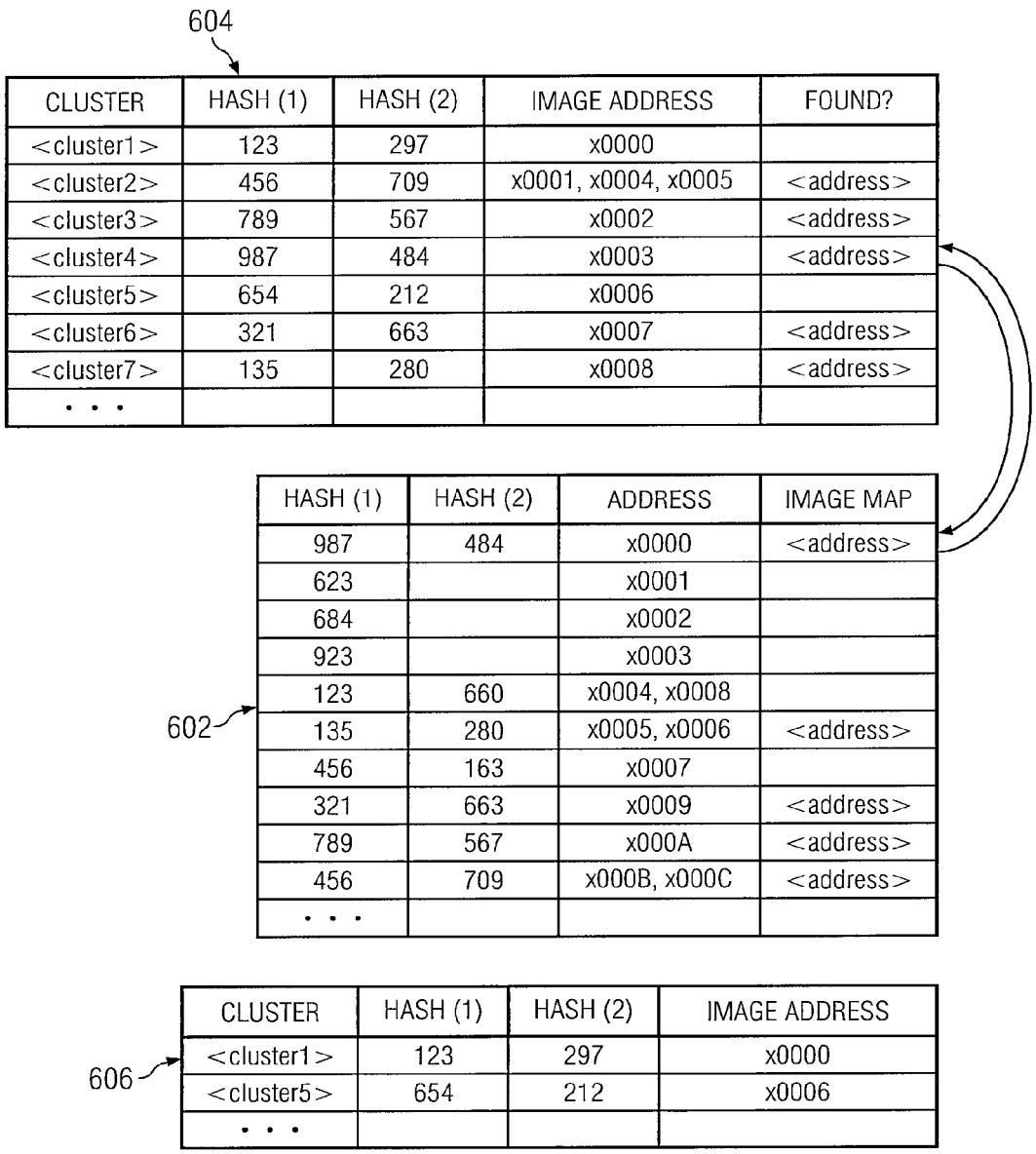
FIG. 6 is an illustration of example operation of a system to determine whether clusters for constructing a shared image are available.

FIG. 6 is an illustration of example operation of system 100 to determine whether clusters for constructing shared image 116 are available by comparing a shared image cluster hash table 604—describing the contents and structure of host shared image 110—and a contents hash table 602 describing the contents of client contents 114. Shared image cluster hash table 604 and contents hash table 602 may be constructed and compared by one or a combination of client distribution modules 112 and host distribution modules 108. The comparison of contents hash table 602 and shared image cluster hash table 604 may yield a difference table 606, which may be used to determine what content or clusters should be downloaded to client distribution modules 112 for installation on client 104a.

Shared image cluster hash table 604 and contents hash table 602 may each contain fields for one or more hashes. Contents hash table 602 may include fields for an image map for an address or location of the entry on client 104a. Shared image cluster hash table 604 may include fields for indicating whether a given entry in shared image cluster hash table 604 has been found in contents hash table 602 and, if found, an address wherein the corresponding content on client 104a may be found. Such an address may be used by client distribution modules 112 when constructing shared image 116 from contents already existing on client 104a. Furthermore, shared image cluster hash table 604 may include an indication of a given cluster's identity. In addition, shared image cluster hash table 604 may include an indication of an image address of the host shared image 110 where the cluster entry resides.

Difference table 606 may include fields for a cluster identity, hashes, and an image address for the cluster as it resides in host shared image 110. Entries in difference table 606 may reflect clusters of host shared image 110 that are not present on client 104a in client contents 114. Host distribution modules 108 may select such elements for download to client distribution modules 112, which may use such elements—in combination with elements already present and identified in shared image cluster hash table 604 and contents hash table 602—to construct shared image 116.

For example, shared image cluster hash table 604 may illustrate that contents of shared image 116 may include "cluster1" with hashes "123" and "297" located at image address x0000; "cluster2" with hashes "456" and "709" located at image addresses x0001, x0004, and x0005; "cluster3" with hashes "789" and "567" located at image address x0002; "cluster4" with hashes "987" and "484" located at image address x0003; "cluster5" with hashes "654" and "212" located at image address x0006; "cluster6" with hashes "321" and "663" located at image address x0007; and "cluster7" with hashes "135" and "280" located at image address x0008.

In one embodiment, client distribution modules 112 may be configured to perform a first hash for a given entry in contents hash table 602, but not immediately perform a second hash for the given entry. Given the large number of possible clusters on client 104a, performing hash calculations on each such cluster may be costly in terms of computing resources. Client distribution modules 112 may be configured to perform a second hash for a given entry if the given entry's first hash matches an element from shared image cluster hash table 604. The manner in which a hash value or digital signature is generated may differ between the first hash and second hash. By performing multiple such hash operations on the same input data, errors due to hash collisions may be avoided. Thus, client distribution modules 112 may generate contents hash table 602 including a first hash "987" for the cluster at address x0000; a first hash "623" for the cluster at address x0001; a first hash "684" for the cluster at address x0002; a first hash "923" for the cluster at address x0003; a first hash "123" for the clusters at addresses x0004 and x0008; a first hash "135" for the clusters at addresses x0005 and x0006; a first hash "456" for the cluster at address x0007; a first hash "321" for the cluster at address x0009; a first hash "789" for the cluster at address x000A; and a first hash "456" for the clusters at addresses x000B and x000C.

Client distribution modules 112 may compare each element of shared image cluster hash table 604 against entries from contents hash table 602 to determine whether there is a match. Such a match may indicate that the cluster is already present on client 104a and will not need to be downloaded or otherwise transferred. If a match is made, client distribution modules 112 may note the address, location, or image map parameters of the contents as they reside on client 104a. Such an address may be given in contents hash table 602. If a match is not made, the entry not found may be placed into difference table 606 along with an address of the cluster as it resides in host shared image 110. After completion of scanning for matches of the entries of shared image cluster hash table 604, client distribution modules 112 may receive the contents of difference table 606 and, together with the matched contents identified in shared image cluster hash table 604, build shared image 116 on client 104a.

For example, the element in contents hash table 602 with a first hash "987" for at address x0000 may match, at least preliminarily, the element of shared image cluster hash table 604 for "cluster4" at address x0003. Such a match may be made based on the matching first hash value of "987". Given the matching first hash value, client distribution modules 112 may determine a second hash value of "484" for the element from contents hash table 602, which may match the element of shared image cluster hash table 604. Thus, it may be determined that the element for "cluster4" at address x0003 of shared image cluster hash table 604 may already be present on client 104a at address x0000. Furthermore, the element may not be recorded in difference table 606. In addition, the location of the element as it resides in client 104a may be recorded in shared image cluster hash table 604 or contents hash table 602, or a link provided between the corresponding entries in each such table. Thus, when client distribution modules 112 creates shared image 116, a reference to the correct location and correct version of the available cluster may be made. In building shared image 116, client distribution modules 112 may copy the cluster to multiple locations as necessary.

In another example, the element in contents hash table 602 with a first hash "123" at addresses x0004 and x0008 may match, at least preliminarily, the element of shared image cluster hash table 604 for "cluster1" with hash "123" at address x0000. Such a match may be made based on the matching first hash value of "123". Given the matching first hash value, client distribution modules 112 may determine a second hash value of "660" for the element from contents hash table 602, which may not match the second hash value—"269"—of the corresponding element of shared image cluster hash table 604. This example may represent a situation in which a cluster passes a first hash matching test but fails a second hash matching test, indicating a hash collision condition. No other matches for the element from shared image cluster hash table 604 may be found in contents hash table 602. Thus, it may be determined that the element for "cluster1" with hash "123" at address x0000 of shared image cluster hash table 604 is not found and it may be added to difference table 606.

In yet another example, after scanning contents hash table 602 for all elements of shared image cluster hash table 604, the element of contents hash table 602 with hash "623" located at address x0001 may not match any such elements from shared image cluster hash table 604. Thus, such an element may be ignored as irrelevant to construction of shared image 116.

Figure 7:
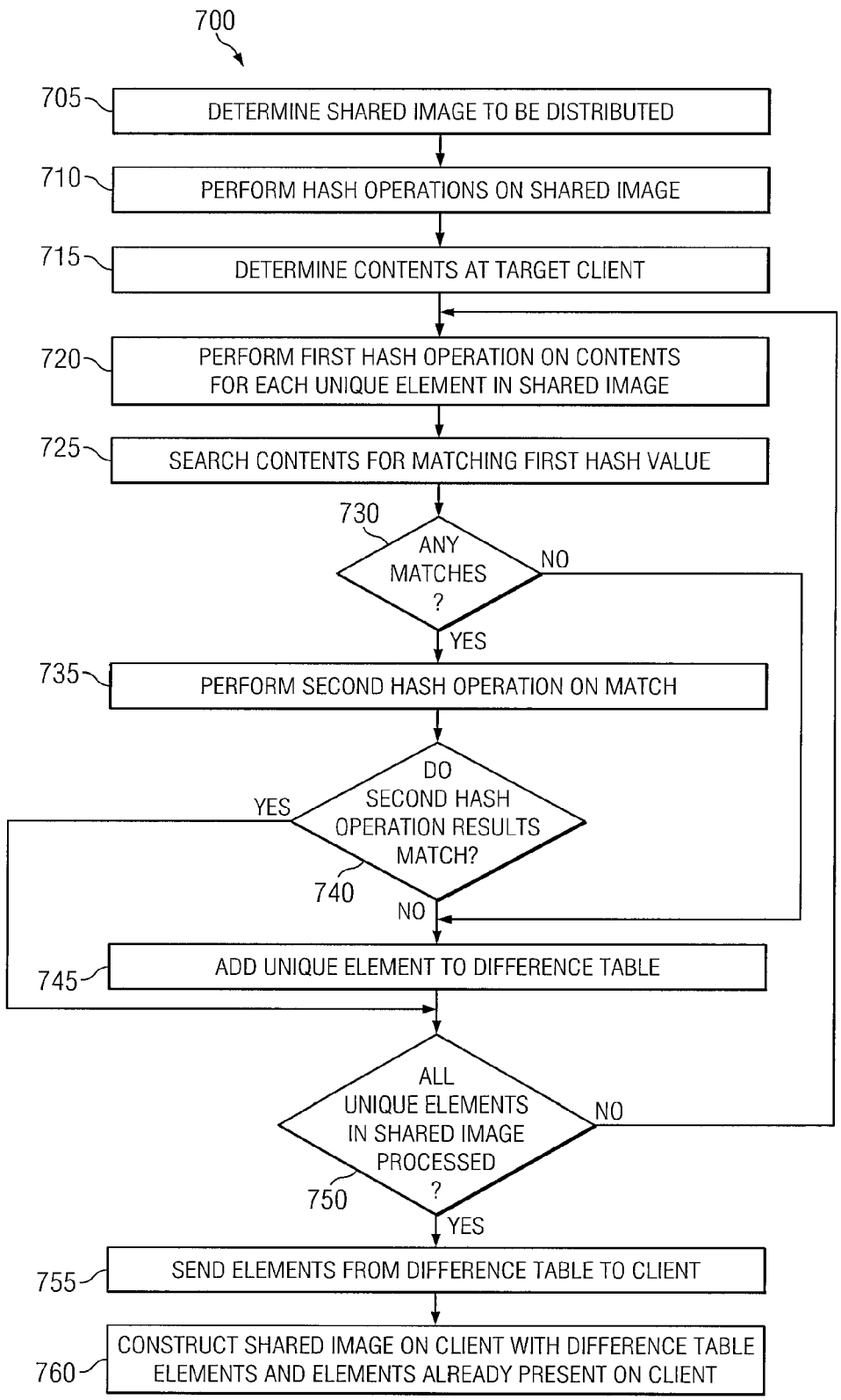
FIG. 7 is an example embodiment of a method for efficient shared image deployment.

FIG. 7 is an example embodiment of a method 700 for efficient shared image deployment. In 705, a shared image to be distributed to one or more clients may be determined. Such a shared image may reside on a server of a network. The shared image may include an installation of a virtual machine, anti-malware solution, secured module, or other software. The contents of the shared image may be determined by categorizing or identifying the contents according to, for example, files or clusters. In 710, two hash operations, each different than the other, may be performed on each of the contents. The results of the hash operations, the identity of the contents such as name or directory, and an address within an image map of the shared image may be made and recorded into a table. Multiple identical components may be condensed into a signal entry within the table, with the multiple associated locations indicated in the table.

In 715, the contents on a target client may be determined. Such contents may include, for example, files or clusters. In 720, a first hash operation, corresponding to the first hash operation performed in 710, may be performed on each determined element or portion of content. The hash operation may be performed for each unique element within a shared image. Thus, an element with multiple instances within the shared image may be only evaluated once with hash operations. In one embodiment, only such a first hash operation may be performed in 720. In another embodiment, a second hash operation corresponding to the second hash operation performed in 710 may be performed in 720. The results of the hash operations, the identity of the contents such as name or directory, and an address, directory, or location within an image map of the contents as they reside on the client may be recorded into a table. Multiple identical components may be condensed into a signal entry within the table, with the multiple associated locations indicated in the table.

In 725, the contents of the target client may be searched for a match for the unique element. Method 700 may repeat elements 720-750 for each such unique element in the shared image. The search for matching elements may be performed by comparison of hash results. Furthermore, the search for matching elements may be performed by comparison of the tables generated in 705-720. In one embodiment, such a search may include a search for matching results of the first hash operation. In 730, it may be determined whether any matches exist between the shared image and the contents existing at the target client. If no matches exist, method 700 may proceed to 745. If any matches do exist, for each such match, in 735 the second hash operation may be performed on the matching element from the contents at the target client. The second hash operation may correspond to the second hash operation performed in 710. In 740, it may be determined whether the results of performing the second hash operation on the content at the target client and the element in the shared image match. If so, method 700 may proceed to 750. If not, then method 700 may proceed to 745.

In 745, the unique element from the shared image may be recorded to a difference table, along with an address or other location from the shared image where the element is located. In 750, it may be determined whether all unique elements in the shared image have been evaluated for matches to the target client contents. If not, then method 700 may proceed to 725 for a different unique element. If so, then method 700 may proceed to 755.

In 755, the difference table may include a listing of all elements from the shared image which are not available on the target client. The elements from the difference table may be sent to the target client.

In 760, the shared image may be reconstructed into a local image on the target client. Building such a local image may include copying or executing elements received from the original shared image and portions already available on the target client into correct positions and locations.

Method 700 may be implemented using the system of FIGS. 1-6, or any other system operable to implement method 700. As such, the preferred initialization point for method 700 and the order of the elements comprising method 700 may depend on the implementation chosen. In some embodiments, some portions of method 700 may be optionally omitted, repeated, or combined. In certain embodiments, method 700 may be implemented partially or fully in software embodied in computer-readable media.

Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. The methods described herein may be provided as a computer program product that may include one or more machine readable media having stored thereon instructions that may be used to program a processing system or other electronic device to perform the methods. The term "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

A method for distribution of a shared image may include determining results of a first hash operation applied to a plurality of elements of a shared image of software, by a software module executing on a processor. A method may also include determining results of the first hash operation applied to a plurality of contents of a client, by a software module executing on a processor. Furthermore, a method may include comparing results of the first hash operation applied to the plurality of elements of the image with the results of the first hash operation applied to the plurality of contents of the client, by a software module executing on a processor. Additionally, A method may include, based on the comparison of the results of the first hash operation applied to the plurality of elements of the image with the results of the first hash operation applied to the plurality of contents of the client, determining that one or more of the plurality of elements of the image are unavailable on the client, by a software module executing on a processor. Also, a method may include causing transmission of the elements of the image that are determined to be unavailable on the client to the client, by a software module executing on a processor. A method may also include determining results of a second hash operation applied to the plurality of elements of the image of the shared image, by a software module executing on a processor. Additionally, a method may include, based on the comparison of the results of the first hash operation applied to the plurality of elements of the image with the results of the first hash operation applied to the plurality of contents of the client, determining results of second hash operation applied to one or more of the plurality of contents of the client, by a software module executing on a processor. Moreover, a method may include comparing results of the second hash operation applied to the plurality of elements of the image with the results of the second hash operation applied to the plurality of contents of the client, by a software module executing on a processor. Determining that one or more of the plurality of elements of the image are unavailable on the client may be further based on the comparison of the results of the second hash operation applied to the plurality of elements of the image with the results of the second hash operation applied to the plurality of contents of the client. The results of the first hash operation may be from files of the plurality of elements of the image and from files of the plurality of contents of the client. The plurality of elements of the image and the plurality of contents of the client may be determined according to clusters. A method may also include, based on the comparison of the results of the first hash operation applied to the plurality of elements of the image with the results of the first hash operation applied to the plurality of contents of the client, determining that one or more of the plurality of elements of the image are available on the client, by a software module executing on a processor. The transmission of the elements of the image that are determined to be unavailable on the client may omit the elements of the image that are determined to be available on the client. Determining results of a first hash operation applied to the plurality of elements of the shared image of software may include receiving the results of the first hash operation applied to the plurality of elements of the shared image of software. Determining results of the first hash operation applied to the plurality of contents of the client may include performing the first hash operation applied to the plurality of contents of the client. Moreover, a method may include, based on the comparison of the results of the first hash operation applied to the plurality of elements of the image with the results of the first hash operation applied to the plurality of contents of the client, determining that one or more of the plurality of elements of the image are available on the client, by a software module executing on a processor. The method may further include determining a location of the elements of the image that are determined to be available on the client, by a software module executing on a processor. In addition, a method may include causing a reconstruction of the image on the client using the elements of the image that are transmitted and the elements of the image that are determined to be available on the client, wherein causing the reconstruction includes causing the elements of the image that are determined to be available on the client to be copied to the image, by a software module executing on a processor.

At least one machine readable storage medium comprises computer-executable instructions carried on the computer readable medium. The instructions are readable by a processor. The instructions, when read and executed, configure the processor to determine results of a first hash operation applied to a plurality of elements of a shared image of software. The processor may also be configured to determine results of the first hash operation applied to a plurality of contents of the client. Moreover, the processor may be configured to compare results of the first hash operation applied to the plurality of elements of the image with the results of the first hash operation applied to the plurality of contents of the client. Also, the processor may be configured to, based on the comparison of the results of the first hash operation applied to the plurality of elements of the image with the results of the first hash operation applied to the plurality of contents of the client, determine that one or more of the plurality of elements of the image are unavailable on the client. In addition, the processor may be configured to cause the transmission of the elements of the image that are determined to be unavailable on the client to the client. The processor may be further configured to determine results of a second hash operation applied to the plurality of elements of the shared image. Based on the comparison of the results of the first hash operation applied to the plurality of elements of the image with the results of the first hash operation applied to the plurality of contents of the client, the processor may be configured to determine results of the second hash operation applied to one or more of the plurality of contents of the client. The processor may be configured to compare results of the second hash operation applied to the plurality of elements of the image with the results of the second hash operation applied to the plurality of contents of the client. Determining that one or more of the plurality of elements of the image are unavailable on the client may be further based on the comparison of the results of the second hash operation applied to the plurality of elements of the image with the results of the second hash operation applied to the plurality of contents of the client. The first hash operation may be from files of the plurality of elements of the image and on files of the plurality of contents of the client. The plurality of elements of the image and the plurality of contents of the client may be determined according to clusters. The processor may be further configured to, based on the comparison of the results of the first hash operation applied to the plurality of elements of the image with the results of the first hash operation applied to the plurality of contents of the client, determine that one or more of the plurality of elements of the image are available on the client. The transmission of the elements of the image that are determined to be unavailable on the client may omit the elements of the image that are determined to be available on the client. Determining results of a first hash operation applied to the plurality of elements of the shared image of software may include receiving the results of the first hash operation applied to the plurality of elements of the shared image of software. Determining results of the first hash operation applied to the plurality of contents of the client may include performing the first hash operation on the plurality of contents of the client. The processor may be further configured to, based on the comparison of the results of the first hash operation applied to the plurality of elements of the image with the results of the first hash operation applied to the plurality of contents of the client, determine that one or more of the plurality of elements of the image are available on the client. Also, the processor may be configured to determine a location of the elements of the image that are determined to be available on the client. Moreover, the processor may be configured to cause a reconstruction of the image on the client using the elements of the image that are transmitted and the elements of the image that are determined to be available on the client. Causing the reconstruction includes causing the elements of the image that are determined to be available on the client to be copied to the image.

A system for distribution of a shared image may include a processor, at least one computer-readable medium communicatively coupled to the processor, and a distribution module comprising one or more instructions resident within the computer-readable medium. The instructions, when executed on a processor, configure the processor to determine results of a first hash operation applied to a plurality of elements of a shared image of software. The processor may also be configured to determine results of the first hash operation applied to a plurality of contents of the client. Moreover, the processor may be configured to compare results of the first hash operation applied to the plurality of elements of the image with the results of the first hash operation applied to the plurality of contents of the client. Also, the processor may be configured to, based on the comparison of the results of the first hash operation applied to the plurality of elements of the image with the results of the first hash operation applied to the plurality of contents of the client, determine that one or more of the plurality of elements of the image are unavailable on the client. In addition, the processor may be configured to cause the transmission of the elements of the image that are determined to be unavailable on the client to the client. The processor may be further configured to determine results of a second hash operation applied to the plurality of elements of the shared image. Based on the comparison of the results of the first hash operation applied to the plurality of elements of the image with the results of the first hash operation applied to the plurality of contents of the client, the processor may be configured to determine results of the second hash operation applied to one or more of the plurality of contents of the client. The processor may be configured to compare results of the second hash operation applied to the plurality of elements of the image with the results of the second hash operation applied to the plurality of contents of the client. Determining that one or more of the plurality of elements of the image are unavailable on the client may be further based on the comparison of the results of the second hash operation applied to the plurality of elements of the image with the results of the second hash operation applied to the plurality of contents of the client. The first hash operation may be from files of the plurality of elements of the image and on files of the plurality of contents of the client. The plurality of elements of the image and the plurality of contents of the client may be determined according to clusters. The processor may be further configured to, based on the comparison of the results of the first hash operation applied to the plurality of elements of the image with the results of the first hash operation applied to the plurality of contents of the client, determine that one or more of the plurality of elements of the image are available on the client. The transmission of the elements of the image that are determined to be unavailable on the client may omit the elements of the image that are determined to be available on the client. Determining results of a first hash operation applied to the plurality of elements of the shared image of software may include receiving the results of the first hash operation applied to the plurality of elements of the shared image of software. Determining results of the first hash operation applied to the plurality of contents of the client may include performing the first hash operation on the plurality of contents of the client. The processor may be further configured to, based on the comparison of the results of the first hash operation applied to the plurality of elements of the image with the results of the first hash operation applied to the plurality of contents of the client, determine that one or more of the plurality of elements of the image are available on the client. Also, the processor may be configured to determine a location of the elements of the image that are determined to be available on the client. Moreover, the processor may be configured to cause a reconstruction of the image on the client using the elements of the image that are transmitted and the elements of the image that are determined to be available on the client. Causing the reconstruction includes causing the elements of the image that are determined to be available on the client to be copied to the image.

A system for distribution may include means for determining results of a first hash operation applied to a plurality of elements of a shared image of software. A system may also include means for determining results of the first hash operation applied to a plurality of contents of a client. Furthermore, a system may include means for comparing results of the first hash operation applied to the plurality of elements of the image with the results of the first hash operation applied to the plurality of contents of the client. Additionally, a system may include means for, based on the comparison of the results of the first hash operation applied to the plurality of elements of the image with the results of the first hash operation applied to the plurality of contents of the client, determining that one or more of the plurality of elements of the image are unavailable on the client. Also, a system may include means for causing transmission of the elements of the image that are determined to be unavailable on the client to the client. A system may also include means for determining results of a second hash operation applied to the plurality of elements of the image of the shared image. Additionally, a system may include means for, based on the comparison of the results of the first hash operation applied to the plurality of elements of the image with the results of the first hash operation applied to the plurality of contents of the client, determining results of second hash operation applied to one or more of the plurality of contents of the client. Moreover, a system may include means for comparing results of the second hash operation applied to the plurality of elements of the image with the results of the second hash operation applied to the plurality of contents of the client. Determining that one or more of the plurality of elements of the image are unavailable on the client may be further based on the comparison of the results of the second hash operation applied to the plurality of elements of the image with the results of the second hash operation applied to the plurality of contents of the client. The results of the first hash operation may be from files of the plurality of elements of the image and from files of the plurality of contents of the client. The plurality of elements of the image and the plurality of contents of the client may be determined according to clusters. A system may also include means for, based on the comparison of the results of the first hash operation applied to the plurality of elements of the image with the results of the first hash operation applied to the plurality of contents of the client, determining that one or more of the plurality of elements of the image are available on the client. The transmission of the elements of the image that are determined to be unavailable on the client may omit the elements of the image that are determined to be available on the client. Determining results of a first hash operation applied to the plurality of elements of the shared image of software may include means for receiving the results of the first hash operation applied to the plurality of elements of the shared image of software. Determining results of the first hash operation applied to the plurality of contents of the client may include means for performing the first hash operation applied to the plurality of contents of the client. Moreover, a system may include, based on the comparison of the results of the first hash operation applied to the plurality of elements of the image with the results of the first hash operation applied to the plurality of contents of the client, means for determining that one or more of the plurality of elements of the image are available on the client. The system may further include means for determining a location of the elements of the image that are determined to be available on the client. In addition, a system may include means for causing a reconstruction of the image on the client using the elements of the image that are transmitted and the elements of the image that are determined to be available on the client, wherein causing the reconstruction includes causing the elements of the image that are determined to be available on the client to be copied to the image.

Specifics in the examples above may be used anywhere in one or more embodiments.

Although the present disclosure has been described in detail, it should be understood that various changes, substitutions, and alterations can be made hereto without departing from the spirit and the scope of the disclosure as defined by the appended claims.

What is claimed is:

1. A method comprising:
   distributing at least a portion of a shared image of a software installation to a client, wherein the distributing comprises:
   determining a plurality of files needed for the software installation;
   determining, by a hardware processor, first results of a first hash operation applied to the plurality of files needed for the software installation;
   recording in a hash table for the shared image of the software installation the first results;
   determining, by the hardware processor, third results of the first hash operation applied to a plurality of files of the client;
   comparing, by the hardware processor, the first results of the first hash operation applied to the plurality of files needed for the software installation, as recorded in the hash table, with the third results of the first hash operation applied to the plurality of files of the client;
   in response to one of the first results of the first hash operation as applied to a first file of the plurality of files needed for the software installation matching one of the third results of the first hash operation as applied to the first file of the plurality of files of the client:
      determining, by the hardware processor, a second result of a second hash operation applied to the first file of the plurality of files needed for the software installation, wherein the manner in which the second hash operation is applied is different from the manner in which the first hash operation is applied;
      determining, by the hardware processor, a fourth result of the second hash operation applied to the first file of the plurality of files of the client;

comparing, by the hardware processor, the second result of the second hash operation with the fourth result of the second hash operation; and in response to the second result of the second hash operation matching the fourth result of the second hash operation, determining that the first file of the plurality of files needed for the software installation is available on the client determining, by the hardware processor and based at least in part on the comparison of the first results of the first hash operation applied to the plurality of files needed for the software installation with the third results of the first hash operation applied to the plurality of files of the client, that one or more of the plurality of files needed for the software installation are unavailable on the client; and causing, by the hardware processor, transmission of the files needed for the software installation that are determined to be unavailable on the client to the client.

2. The method of claim 1, wherein the plurality of files needed for the software installation and the plurality of files of the client are determined according to clusters.

3. The method of claim 1, wherein comparing the first results of the first hash operation applied to the plurality of files needed for the software installation of software with the third results of the first hash operation applied to the plurality of files of the client comprises:

obtaining the first results of the first hash operation from the hash table for the shared image.

4. The method of claim 1, wherein the distributing further comprises:

determining, by the hardware processor and based on the comparison of the first results of the first hash operation applied to the plurality of files needed for the software installation with the third results of the first hash operation applied to the plurality of files of the client, that at least one of the plurality of files needed for the software installation are available on the client;

determining, by the hardware processor, a location of each of the at least one of the plurality of files needed for the software installation that are determined to be available on the client; and causing a reconstruction of the shared image as a local image on the client using the the plurality of files needed for the software installation that are transmitted and the at least one of the plurality of files needed for the software installation that are determined to be available on the client, wherein causing the reconstruction includes causing the at least one of the plurality of files needed for the software installation that are determined to be available on the client to be copied to the local image, wherein the at least one of the plurality of files needed for the software installation that are determined to be available on the client are omitted from the the plurality of files needed for the software installation that are transmitted.

5. At least one non-transitory computer-readable medium comprising one or more instructions that when executed on a hardware processor configure the hardware processor to:

distribute at least a portion of a shared image of a software installation to a client, wherein the distributing comprises:

determining a plurality of files needed for the software installation;

determining first results of a first hash operation applied to the plurality of files needed for the software installation;

recording in a hash table for the shared image of the software installation the first results;

determining third results of the first hash operation applied to a plurality of files of the client;

comparing the first results of the first hash operation applied to the plurality of files needed for the software installation, as recorded in the hash table, with the third results of the first hash operation applied to the plurality of files of the client;

in response to one of the first results of the first hash operation as applied to a first file of the plurality of files needed for the software installation matching one of the third results of the first hash operation as applied to the first file of the plurality of files of the client:

determining a second result of a second hash operation applied to the first file of the plurality of files needed for the software installation, wherein the manner in which the second hash operation is applied is different from the manner in which the first hash operation is applied;

determining a fourth result of the second hash operation applied to the first file of the plurality of files of the client;

comparing the second result of the second hash operation with the fourth result of the second hash operation; and in response to the second result of the second hash operation matching the fourth result of the second hash operation, determining that the first file of the plurality of files needed for the software installation is available on the client;

determining, based at least in part on the comparison of the first results of the first hash operation applied to the plurality of files needed for the software installation with the third results of the first hash operation applied to the plurality of files of the client, that one or more of the plurality of files needed for the software installation are unavailable on the client; and causing transmission of the files needed for the software installation that are determined to be unavailable on the client to the client.

6. The medium of claim 5, wherein the plurality of files needed for the software installation and the plurality of files of the client are determined according to clusters.

7. The medium of claim 5, wherein comparing the first results of the first hash operation applied to the plurality of files needed for the software installation with the third results of the first hash operation applied to the plurality of files of the client comprises:

obtaining the first results of the first hash operation from the hash table for the shared image.

8. The medium of claim 5, wherein the distributing further comprises:

determining, based on the comparison of the first results of the first hash operation applied to the plurality of files needed for the software installation with the third results of the first hash operation applied to the plurality of files of the client, that at least one of the plurality of files needed for the software installation are available on the client;

determining a location of each of the at least one of the plurality of files needed for the software installation that are determined to be available on the client; and causing a reconstruction of the shared image as a local image on the client using the the plurality of files needed for the software installation that are transmitted and the at least one of the plurality of files needed for the software installation that are determined to be available on the client, wherein causing the reconstruction includes causing the at least one of the plurality of files needed for the software installation that are determined to be available on the client to be copied to the local image, wherein the at least one of the plurality of files needed for the software installation that are determined to be available on the client are omitted from the the plurality of files needed for the software installation that are transmitted.

9. A system, comprising:

a memory; and a hardware processor that is coupled to the memory and that is configured to:

distribute at least a portion of a shared image of a software installation to a client, wherein the distributing comprises:

determining a plurality of files needed for the software installation;

determining first results of a first hash operation applied to the plurality of files needed for the software installation;

recording in a hash table for the shared image of the software installation the first results;

determining third results of the first hash operation applied to a plurality of files of the client;

comparing the first results of the first hash operation applied to the plurality of files needed for the software installation, as recorded in the hash table, with the third results of the first hash operation applied to the plurality of files of the client;

in response to one of the first results of the first hash operation as applied to a first file of the plurality of files needed for the software installation matching one of the third results of the first hash operation as applied to the first file of the plurality of files of the client:

determining a second result of a second hash operation applied to the first file of the plurality of files needed for the software installation, wherein the manner in which the second hash operation is applied is different from the manner in which the first hash operation is applied;

determining a fourth result of the second hash operation applied to the first file of the plurality of files of the client comparing the second result of the second hash operation with the fourth result of the second hash operation; and in response to the second result of the second hash operation matching the fourth result of the second hash operation, determining that the first file of the plurality of files needed for the software installation is available on the client;

determining, based at least in part on the comparison of the first results of the first hash operation applied to the plurality of files needed for the software installation with the third results of the first hash operation applied to the plurality of files of the client, that one or more of the plurality of files needed for the software installation are unavailable on the client; and causing transmission of the files needed for the software installation that are determined to be unavailable on the client to the client.

10. The system of claim 9, wherein the plurality of files needed for the software installation and the plurality of files of the client are determined according to clusters.

11. The system of claim 9, wherein comparing the first results of the first hash operation applied to the plurality of files needed for the software installation with the third results of the first hash operation applied to the plurality of files of the client comprising:

obtaining the first results of the first hash operation from the hash table for the shared image.

12. The system of claim 9, wherein the distributing further comprises:

determining, based on the comparison of the first results of the first hash operation applied to the plurality of files needed for the software installation with the third results of the first hash operation applied to the plurality of files of the client, that at least one of the plurality of files needed for the software installation are available on the client;

determining a location each of the at least one of the plurality of files needed for the software installation that are determined to be available on the client; and causing a reconstruction of the shared image as a local image on the client using the files needed for the software installation that are transmitted and the at least one of the plurality of files needed for the software installation that are determined to be available on the client, wherein causing the reconstruction includes causing the at least one of the plurality of files needed for the software installation that are determined to be available on the client to be copied to the local image, wherein the at least one of the plurality of files needed for the software installation that are determined to be available on the client are omitted from the files needed for the software installation that are transmitted.

* * * * *

UNITED STATES PATENT AND TRADEMARK OFFICE
CERTIFICATE OF CORRECTION

PATENT NO. : 11,126,418 B2
APPLICATION NO. : 13/649970
DATED : September 21, 2021
INVENTOR(S) : Simon Hunt It is certified that error appears in the above-identified patent and that said Letters Patent is hereby corrected as shown below:

In the Claims

Column 19, Claim 1, Line 8:
"is available on the client"
Should be:
--is available on the client;--

Column 19, Claim 4, Line 46:
"image on the client using the the plurality of files"
Should be:
--image on the client using the plurality of files--

Column 21, Claim 8, Line 2:
"image on the client using the the plurality of files"
Should be:
--image on the client using the plurality of files--

Column 21, Claim 8, Lines 12-13:
"from the the plurality of files"
Should be:
--from the plurality of files--

Column 21, Claim 9, Line 40:
"plurality of files of the client:"
Should be:
--plurality of files of the client;--

Column 21, Claim 9, Line 48:
"client comparing the second result"

Signed and Sealed this
Fifth Day of March, 2024

Katherine Kelly Vidal
Director of the United States Patent and Trademark Office

Should be:
--client; comparing the second result--

Column 22, Claim 12, Line 35:
"determining a location each of the at least one"
Should be:
--determining a location of each of the at least one--